(12) United States Patent
Gavade et al.

(10) Patent No.: US 10,887,379 B2
(45) Date of Patent: Jan. 5, 2021

(54) DYNAMICALLY DETERMINING A CONTENT DELIVERY NETWORK FROM WHICH TO RECEIVE CONTENT

(71) Applicant: Verizon Patent and Licensing Inc., Arlington, VA (US)

(72) Inventors: Sameer Gavade, Irving, TX (US); Sanjay Ahuja, Irving, TX (US); Binayak Biswal, Frisco, TX (US); Anil Kumar Padi, Flower Mound, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 192 days.

(21) Appl. No.: 15/709,994

(22) Filed: Sep. 20, 2017

(65) Prior Publication Data
US 2019/0089772 A1  Mar. 21, 2019

(51) Int. Cl.
*G06F 15/16* (2006.01)
*H04L 29/08* (2006.01)
*H04L 29/06* (2006.01)

(52) U.S. Cl.
CPC ........ *H04L 67/101* (2013.01); *H04L 65/4084* (2013.01); *H04L 65/80* (2013.01); *H04L 67/26* (2013.01); *H04L 67/42* (2013.01); *H04L 67/322* (2013.01)

(58) Field of Classification Search
None
See application file for complete search history.

(56) References Cited

U.S. PATENT DOCUMENTS

| 10,178,043 | B1* | 1/2019 | Ganjam | H04L 47/801 |
| 2013/0326024 | A1* | 12/2013 | Chen | H04L 65/4084 709/219 |
| 2014/0108671 | A1* | 4/2014 | Watson | H04L 65/4084 709/231 |
| 2015/0134847 | A1* | 5/2015 | Fu | H04L 47/29 709/234 |

(Continued)

OTHER PUBLICATIONS

Mozilla, "Head" https://developer.mozilla.org/en-US/docs/Web/HTTP/Methods/HEAD, Jun. 7, 2017, 2 pages.

*Primary Examiner* — Umar Cheema
*Assistant Examiner* — Anthony T Rotolo

(57) ABSTRACT

A device can receive information related to an availability of content from multiple content delivery networks or a capability of the multiple content delivery networks to provide the content. The device can determine to receive a first portion of the content from a first content delivery network based on the information. The device can receive the first portion of the content from the first content delivery network. The device can receive additional information related to the availability of the content from the multiple content delivery networks or the capability of the multiple content delivery networks to provide the content. The device can determine to receive a second portion of the content from a second content delivery network based on the additional information. The device can receive the second portion of the content from the second content delivery network. The device can perform an action.

20 Claims, 7 Drawing Sheets

(56) References Cited

U.S. PATENT DOCUMENTS

| | | | |
|---|---|---|---|
| 2015/0156239 A1* | 6/2015 | Pearson | H04L 43/0858 |
| | | | 709/219 |
| 2016/0337426 A1* | 11/2016 | Shribman | H04L 65/4084 |
| 2017/0188059 A1* | 6/2017 | Major | H04N 21/2402 |
| 2018/0054645 A1* | 2/2018 | Streijl | H04N 21/4622 |

* cited by examiner

DYNAMICALLY DETERMINING A CONTENT DELIVERY NETWORK FROM WHICH TO RECEIVE CONTENT

BACKGROUND

A content delivery network (CDN) is a geographically distributed network of proxy servers and data centers, distributing service spatially relative to end-users in order to provide high availability and high performance. A CDN can facilitate a variety of different types of content delivery services including video streaming, software downloads, and web and mobile content delivery. A CDN can serve a number of different types of content, including web objects (e.g., text, graphics, and/or scripts), downloadable objects (e.g., media files, software, and/or documents), applications (e.g., e-commerce applications, portals, etc.), live streaming media, on-demand streaming media, and/or social networks.

DETAILED DESCRIPTION OF PREFERRED EMBODIMENTS

The following detailed description of example implementations refers to the accompanying drawings. The same reference numbers in different drawings can identify the same or similar elements.

When requesting content from a content delivery network (CDN), a user device might have to request and/or download chunks of the content to determine an availability of the content from the CDN, whether the user device has permission to access the content (e.g., a digital rights management (DRM) license related to the user device and/or the content), and/or the like. Requesting and/or downloading chunks of content to determine this information consumes network resources, such as bandwidth, and/or processing resources of the CDN and/or the user device (e.g., when the user device does not have permission to access the content). As a specific example, significant network and/or processing resources can be consumed when the same chunk is requested and/or downloaded from multiple CDNs, such as when the chunk is downloaded from the multiple CDNs to permit analysis of a capability of the multiple CDNs to provide the content. In addition, the user device can request and/or download chunks of the content from a particular CDN until the download fails, at which time the user device can request and/or download chunks of the content from another CDN. This can result in lag with regard to providing the content for display, a delay with respect to live content, and/or the like.

Some implementations, described herein, provide a user device that is capable of requesting information related to an availability of content requested by a user of the user device, information related to a permission of the user device to access the content, and/or information related to a capability of a CDN to provide the requested content without requesting and/or downloading chunks of the content. The user device can request this information from multiple CDNs at the same time. In this way, the user device can use this information to dynamically identify content to request and/or download and/or a CDN from which to request the content prior to requesting and/or downloading chunks of the content (e.g., in real-time or near real-time). This conserves network resources that would otherwise be consumed requesting and/or downloading chunks of the content that the user device cannot use or that the CDN cannot provide at a threshold level of performance (e.g., at a threshold bit rate). In addition, this conserves processing resources of the CDN by reducing or eliminating a need for the CDN to provide chunks of content that the user device cannot use. Further, this conserves network resources and/or processing resources of multiple CDNs that would be consumed providing the same chunk of content to the user device to permit analysis of a capability of the multiple CDNs to provide the content.

Figure 1A:
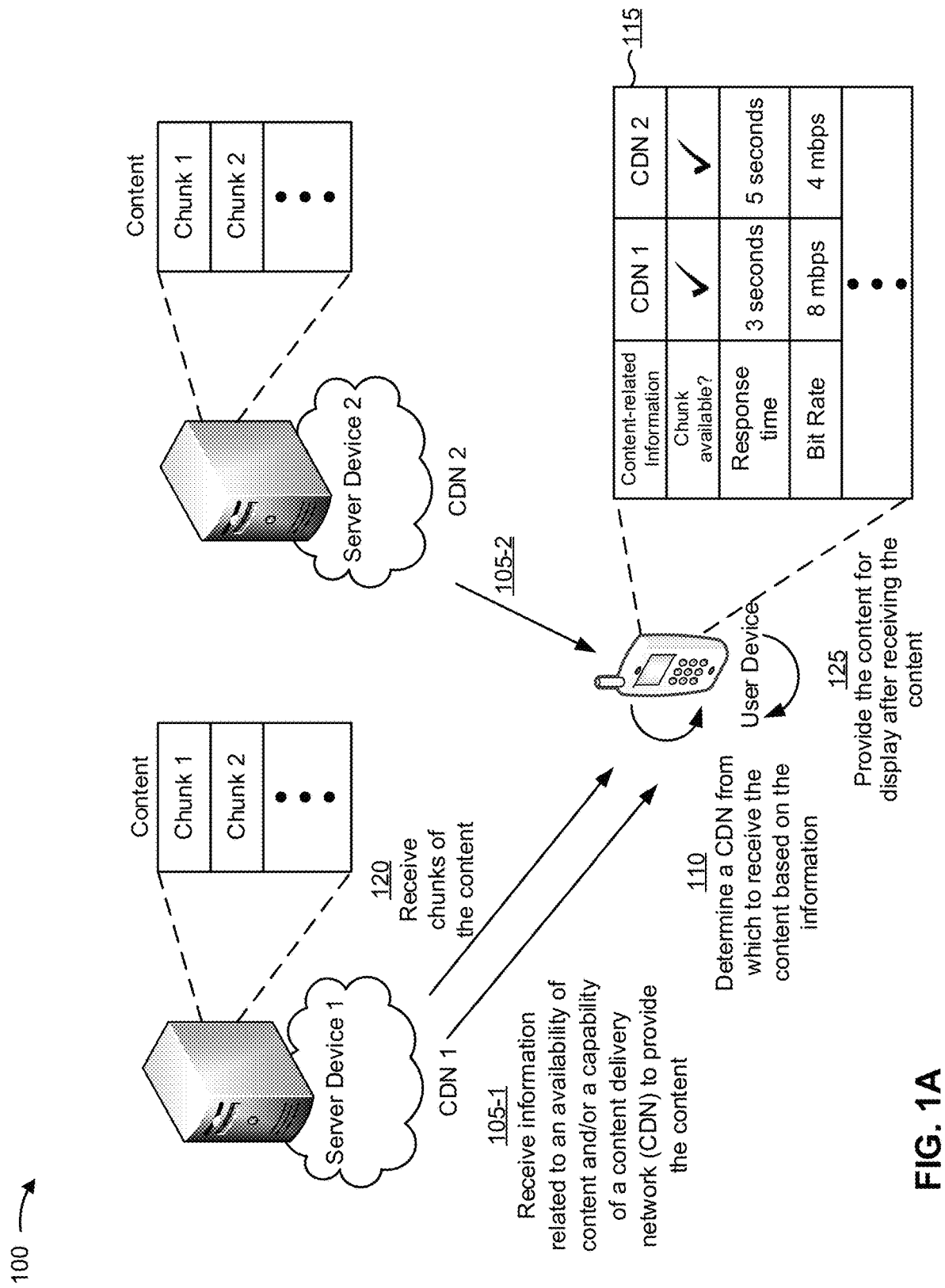
FIGS. 1A and 1B are diagrams of an overview of an example implementation described herein.
Figure 1B:
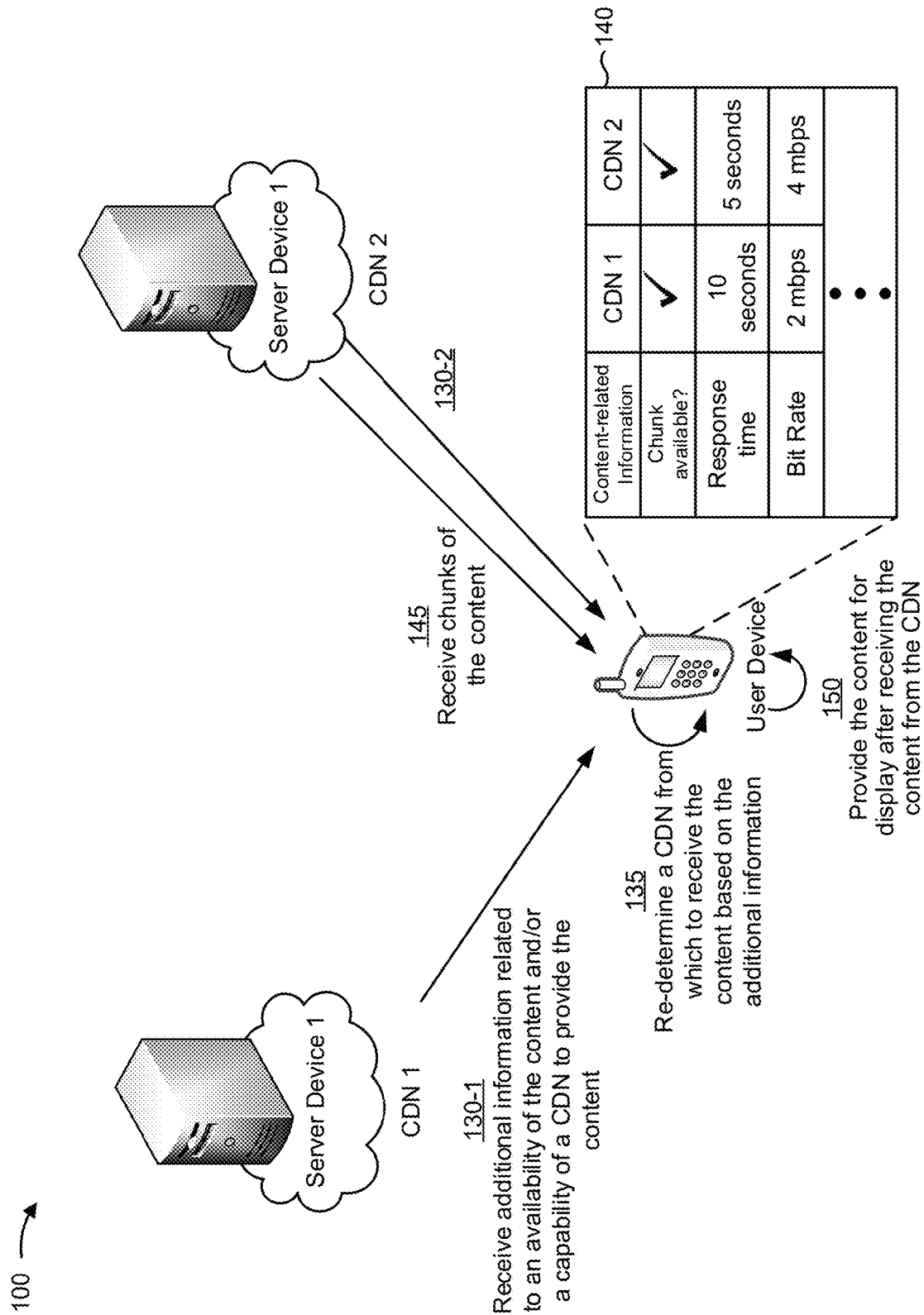

FIGS. 1A and 1B are diagrams of an overview of an example implementation 100 described herein. As shown in FIGS. 1A and 1B, example implementation 100 can include multiple CDNs (shown as CDN 1 and CDN 2), multiple server devices associated with the multiple CDNs (shown as server device 1 and server device 2), and a user device. Although FIGS. 1A and 1B show two CDNs and two server devices, in practice, there can be hundreds, thousands, etc. of CDNs and/or server devices.

As shown in FIG. 1A, and by reference numbers 105-1 and 105-2, the user device can receive information related to an availability of content and/or a capability of a CDN to provide the content. For example, the user device can receive information that identifies chunks of content that are stored by server devices associated with the multiple CDNs, an amount of available bandwidth between each of the multiple CDNs and the user device, a response time of each of the multiple CDNs, a bit rate at which each of the multiple CDNs can provide chunks associated with the requested content, a signal strength of a signal that the user device is using to communicate with each of the multiple CDNs, a software version of software used by each of the multiple CDNs, and/or the like. In some implementations, the user device can receive thousands, millions, etc. of data elements when receiving the information. In this way, the user device can receive a data set that cannot be processed manually or objectively by a human actor.

In some implementations, the user device can receive the information based on requesting the information. For example, the user device can receive the information based on providing a hypertext transfer protocol (HTTP) head request to each of the multiple CDNs, rather than providing an HTTP get request. This conserves network and/or processing resources of the multiple CDNs and/or the user device by permitting the user device to request metadata related to content without requesting the corresponding content. In some implementations, the user device can receive the information by monitoring for the information rather than requesting the information from each of the CDNs.

As further shown in FIG. 1A, and by reference number 110, the user device can determine a CDN from which to receive the content based on the information. For example, the user device can determine the CDN based on information satisfying a threshold, based on needing to provide the content at a threshold level of performance (e.g., at a threshold bit rate or a threshold quality, such as at a threshold resolution), whether the content is available from a particular CDN, whether the user device has permission to access the content from a particular CDN (e.g., has a particular DRM license), and/or the like.

As further shown in FIG. 1A, reference number 115 shows an example of information that the user device can receive from each of the CDNs and/or determine based on monitoring for the information. In this case, the user device can select CDN 1 as the CDN from which to start receiving the content based on the content being available from CDN 1, based on CDN 1 having a faster response time relative to CDN 2 (e.g., three seconds relative to five seconds), based on CDN 1 being able to provide chunks of the content at a higher bit rate relative to CDN 2, based on the user device being able to receive the content at a higher bit rate from CDN 1 relative to CDN 2 (e.g., eight megabits per second (mbps) compared to four mbps), and/or the like.

In some implementations, the user device can determine a score based on the information when determining a particular CDN from which to start receiving the content. For example, the user device can determine a score for information based on the information satisfying a threshold, can determine a weighted score by weighting the information with various weights (e.g., based on importance, based on a user preference related to quality or interruptions to playback, etc.), can determine an average score over time for each CDN or an average score for information received from each CDN, and/or the like. The user device can select a particular CDN based on a score satisfying a threshold, based on a score being the highest score relative to other CDNs, based on a score for particular items of information satisfying a threshold, and/or the like. For example, the user device can select CDN 1 as the CDN from which to start receiving the content based on CDN 1 being associated with a higher score relative to CDN 2.

As further shown in FIG. 1A, and by reference number 120, the user device can receive chunks of the content. For example, the user device can receive chunk 1 from CDN 1. As shown by reference number 125, the user device can provide the content for display after receiving the content from the CDN. For example, the user device can provide chunk 1 for display after receiving chunk 1 from CDN 1.

As shown in FIG. 1B, and by reference numbers 130-1 and 130-2, the user device can receive additional information related to an availability of the content and/or a capability of a CDN to provide the content, similar to the information described above with respect to FIG. 1A, and in a similar manner. That is, the user device can receive additional information that identifies chunks of content that are stored by server devices associated with the multiple CDNs (e.g., server devices 1 and 2 associated with CDNs 1 and 2, respectively), an amount of available bandwidth between each of the multiple CDNs and the user device, a response time of each of the multiple CDNs, a bit rate at which each of the multiple CDNs can provide chunks associated with the requested content, a signal strength of a signal that the user device is using to communicate with each of the multiple CDNs, a software version of software used by each of the multiple CDNs, and/or the like. In some implementations, the user device can receive the information as the user device is receiving chunks of content (e.g., in real-time or near real-time).

As further shown in FIG. 1B, and by reference number 135, the user device can re-determine a CDN from which to receive the content based on the additional information. For example, the user device can determine a CDN based on the additional information in a manner similar to that described above with respect to determining a CDN from which to start to receiving the content.

As further shown in FIG. 1B, reference number 140 shows that the information related to CDN 1 and CDN 2 has changed from that which the user device initially used to determine a CDN from which to start receiving the content. For example, for CDN 1, the response time has changed from three seconds to 10 seconds, and the bit rate has changed from eight mbps to two mbps. In this case, the user device can determine to stop receiving chunks from CDN 1 and to start receiving chunks from CDN 2 (e.g., based on CDN 2 now having a faster response time (five seconds) relative to CDN 1 (10 seconds) and a higher bit rate (four mbps) relative to CDN 1 (two mbps).

In this way, the user device can dynamically determine a CDN from which to receive chunks of the content. This improves delivery of the content to the user device. Further, the user device can dynamically determine the CDN without requesting and/or downloading the chunks of content, thereby conserving network resources and/or processing resources associated with CDNs and/or the user device that would otherwise be consumed requesting chunks of content to be used to determine a CDN from which the user device is to start receiving chunks of content for display.

As further shown in FIG. 1B, and by reference number 145, the user device can receive chunks of the content. For example, the user device can receive, from CDN 2, the next chunk after the last chunk received from CDN 1. As shown by reference number 150, the user device can provide the content for display after receiving the chunks from the CDN. For example, the user device can provide chunks for display after receiving the chunks from CDN 2. In some implementations, the user device can perform another action. For example, the user device can generate a report related to a performance of the CDNs. Additionally, or alternatively, and as another example, the user device can provide a message for display that indicates a change of CDNs used to receive the content.

In this way, a user device can use information to dynamically identify content to request and/or download and/or a CDN from which to request the content prior to requesting and/or downloading chunks of the content (e.g., in real-time or near real-time). This conserves network resources that would otherwise be consumed requesting and/or downloading chunks of the content that the user device cannot use or that the CDN cannot provide at a threshold level of performance (e.g., at a threshold bit rate). In addition, this conserves processing resources of the CDN by reducing or eliminating a need for the CDN to provide chunks of content that the user device cannot use. Further, this conserves network resources and/or processing resources of multiple CDNs that would be consumed providing the same chunk of content to the user device to permit analysis of a capability of the multiple CDNs to provide the content.

As indicated above, FIGS. 1A and 1B are provided merely as an example. Other examples are possible and can differ from what was described with regard to FIGS. 1A and 1B.

Figure 2:
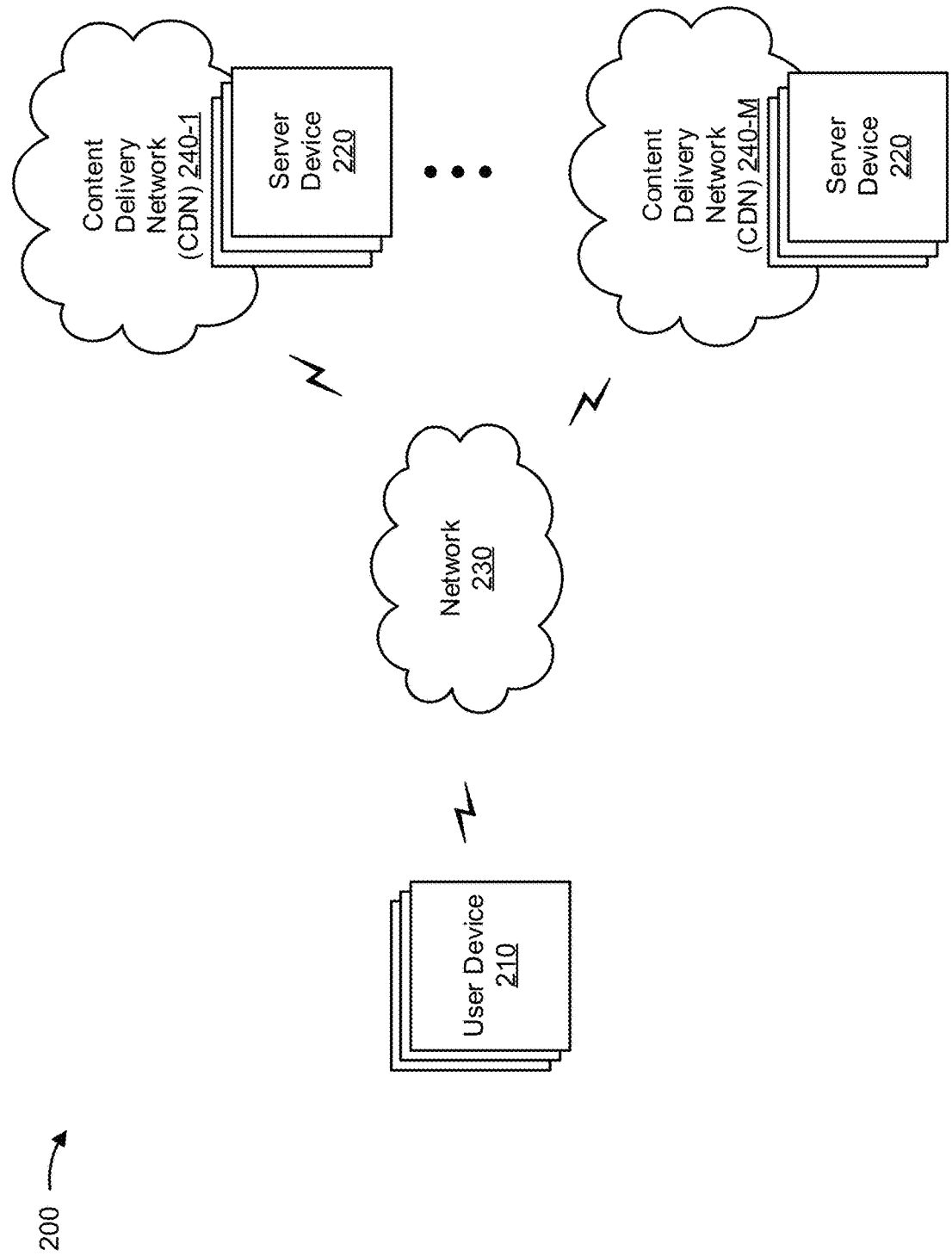
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a set of user device 210, a set of server devices 220, a network 230, and a set of content delivery networks (CDNs) 240-1 through 240-N (N≥1) (hereinafter referred to collectively as "CDNs 240," and individually as "CDN 240"). Devices of environment 200 can interconnect via wired connections, wireless connections, optical connections, or a combination of connections.

User device 210 includes one or more devices capable of receiving, generating, storing, processing, and/or providing information associated with content and/or CDN 240. For example, user device 210 can include a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), or a similar type of device. In some implementations, user device 210 can receive information related to content and/or CDN 240, as described elsewhere herein. Additionally, or alternatively, user device 210 can dynamically determine a particular CDN 240 from which to receive the content, as described in more detail elsewhere herein.

Server device 220 includes one or more devices capable of receiving, storing, providing, processing, and/or generating information associated with content and/or CDN 240. For example, server device 220 can include a server (e.g., a multi-server micro data center), a workstation computer, a virtual machine (VM) provided in a cloud computing environment, or a similar type of device. In some implementations, server device 220 can provide information related to content and/or CDN 240 to user device 210, as described in more detail elsewhere herein. Additionally, or alternatively, server device 220 can provide content (e.g., chunks of content) to user device 210, as described in more detail elsewhere herein.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

CDN 240 includes one or more wired and/or wireless networks. In some implementations, CDN 240 can include a distributed system of server devices 220 (e.g., in one or more data centers) to receive content (e.g., from a content provider) and/or to provide the content for distribution (e.g., to user device 210). For example, CDN 240 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
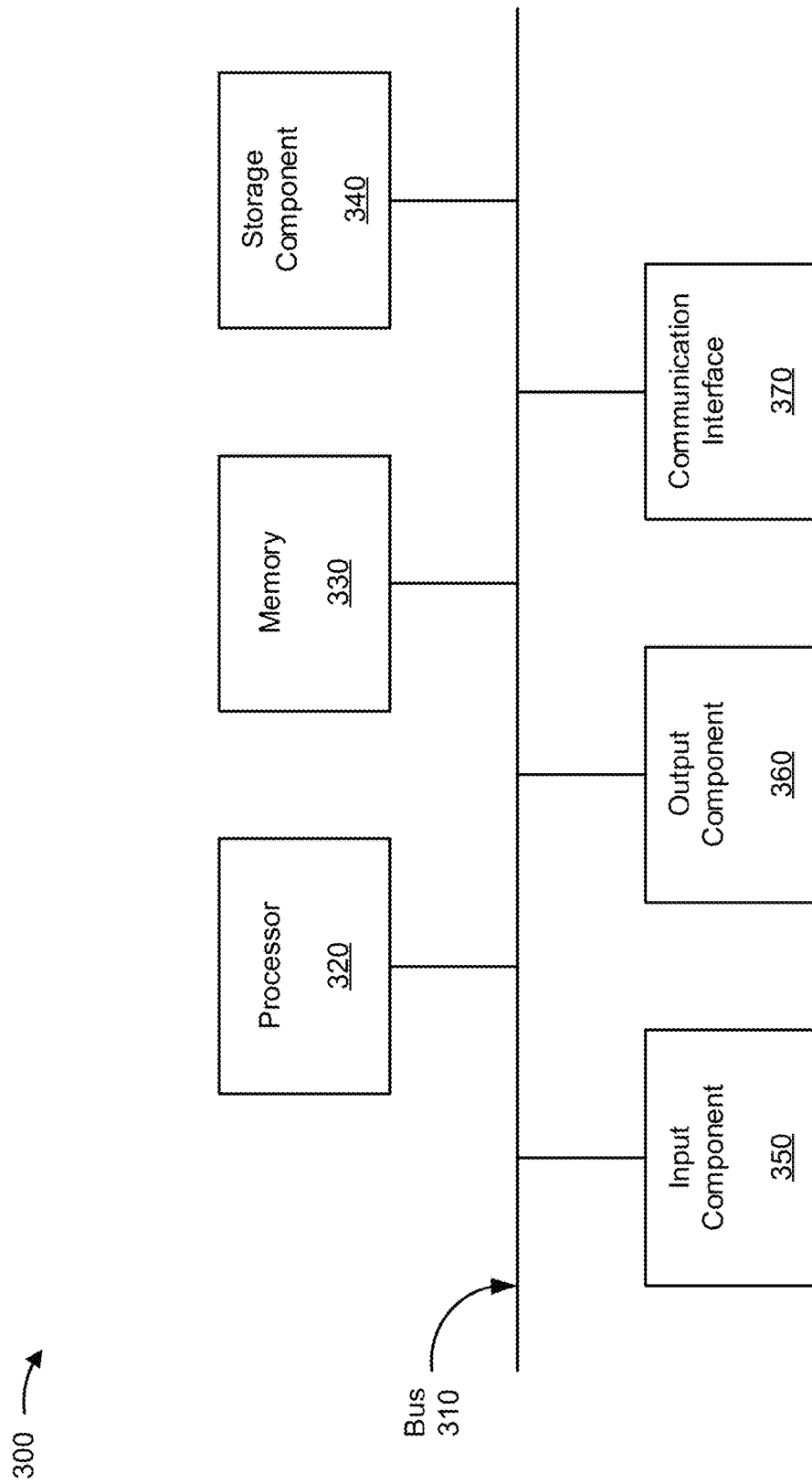
FIG. 3 is a diagram of example components of one or more devices of FIG. 2.

FIG. 3 is a diagram of example components of a device 300. Device 300 can correspond to user device 210 and/or server device 220. In some implementations, user device 210 and/or server device 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, an optical connection, or a combination of connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
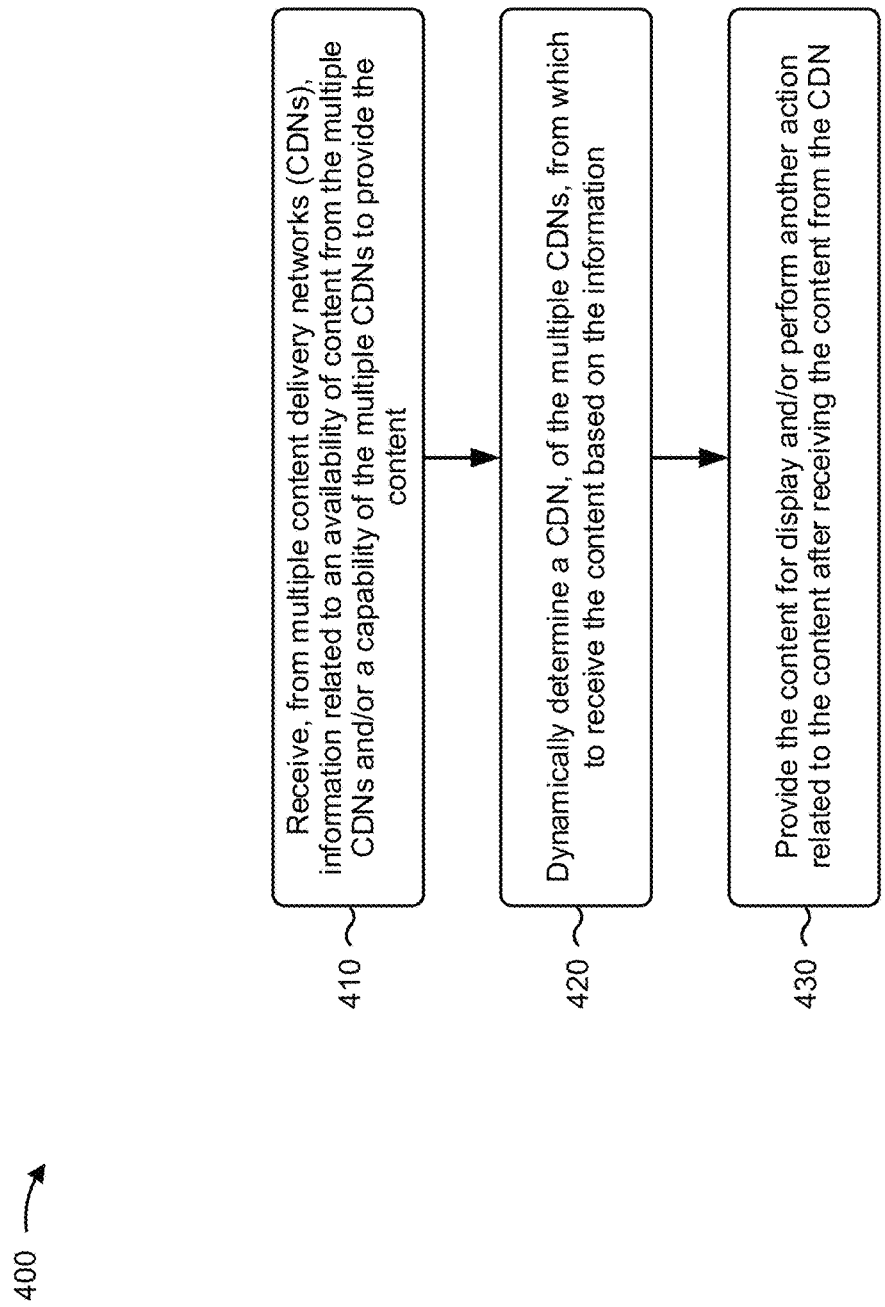
FIG. 4 is a flow chart of an example process for dynamically determining a content delivery network from which to receive content.

FIG. 4 is a flow chart of an example process 400 for dynamically determining a content delivery network from which to receive content. In some implementations, one or more process blocks of FIG. 4 can be performed by user device 210. In some implementations, one or more process blocks of FIG. 4 can be performed by another device or a group of devices separate from or including user device 210, such as server device 220.

As shown in FIG. 4, process 400 can include receiving, from multiple content delivery networks (CDNs), information related to an availability of content from the multiple CDNs and/or a capability of the multiple CDNs to provide the content (block 410). For example, user device 210 can receive, from multiple CDNs 240, information related to an availability of content from the multiple CDNs 240 and/or a capability of the multiple CDNs 240 to provide the content. In some implementations, user device 210 can receive the information periodically, according to a schedule, based on requesting the information, and/or the like. In some implementations, user device 210 can receive the information from multiple CDNs 240. In some implementations, when receiving the information, user device 210 can receive thousands, millions, etc. of data elements. In this way, user device 210 can receive a data set that cannot be processed manually or objectively by a human actor.

In some implementations, the content can include multimedia content, such as video, audio, an image, text, and/or the like. In some implementations, the content can include a set of chunks (e.g., segments, portions, etc.) that can be requested and/or downloaded by user device 210. In some implementations, the content can be stored by server device 220 associated with CDN 240.

In some implementations, the information can identify an availability of content. For example, the information can identify chunks of content that are stored by server devices 220 associated with the multiple CDNs, formats in which the content is stored (e.g., a high-definition format, a standard definition format, etc.), a resolution of the content (e.g., 1080p, 4K, 8K, etc.), a size of the content (e.g., in megabytes (MB), in kilobytes (KB), etc.)), and/or the like.

Additionally, or alternatively, the information can identify a capability of CDN 240 to provide the content. For example, the information can identify an amount of available bandwidth between the multiple CDNs 240 and user device 210, a response time of the multiple CDNs 240, a bit rate at which the multiple CDNs 240 can provide chunks associated with the requested content, a signal strength of a signal that user device 210 is using to communicate with the multiple CDNs 240, a software version of software used by the multiple CDNs 240, and/or the like.

In some implementations, user device 210 can receive the information prior to requesting and/or downloading chunks of content from CDN 240. In this way, user device 210 conserves network resources and/or processing resources associated with receiving the content until user device 210 determines a particular CDN 240 from which to receive the content. In some implementations, user device 210 can receive the information as user device 210 receives the content from a particular CDN 240 (e.g., in real-time or near real-time). This permits user device 210 to dynamically adjust a particular CDN 240 from which user device 210 receives the content, thereby improving reception of the content.

In some implementations, user device 210 can receive the information using a request associated with a protocol. For example, user device 210 can receive the information using an HTTP head request associated with HTTP, rather than using an HTTP get request (which would cause user device 210 to request and/or download a chunk of the content rather than just receive information related to the content). Continuing with the previous example, user device 210 can provide an HTTP head request to CDN 240, and can receive the information after providing the HTTP head request to CDN 240. This conserves network and/or processing resources of CDN 240 and/or user device 210 by permitting user device 210 to request metadata related to content without requesting the content (e.g., without requesting chunks of content).

In some implementations, user device 210 can receive the information based on monitoring for the information. For example, user device 210 can monitor an availability of network resources (e.g., bandwidth, a signal that user device 210 uses to communicate with CDN 240, etc.). Additionally, or alternatively, and as another example, user device 210 can monitor for information related to a capability of CDN 240 to provide the content (e.g., a bit rate at which server device 220 associated with CDN 240 can provide the content, a queue position for user device 210's request for content, etc.).

In some implementations, user device 210 can receive information related to a permission of user device 210 to access the content. For example, user device 210 can provide a token, information that identifies a username/password combination of an account associated with a user of user device 210, information that identifies a license (e.g., a DRM license, a license for a particular resolution of content, etc.), a set of security credentials, and/or the like and can receive information that indicates whether user device 210 can access the content stored by server device 220. As a specific example, user device 210 can provide a token that identifies a DRM license along with an HTTP head request to CDN 240 and can receive a response to the token and/or the HTTP head request that indicates whether user device 210 can access the content identified by the HTTP head request and/or which content user device 210 can access if user device 210 cannot access the content identified by the HTTP head request.

In this way, user device 210 can receive information related to content to permit user device 210 to dynamically determine a particular CDN 240 from which to receive the content.

As further shown in FIG. 4, process 400 can include dynamically determining a CDN, of the multiple CDNs, from which to receive the content based on the information (block 420). For example, user device 210 can dynamically determine CDN 240, of the multiple CDNs 240, from which to receive the content based on the information. In some implementations, when dynamically determining a particular CDN 240 from which to receive content, user device 210 can process thousands, millions, etc. of data elements related to hundreds, thousands, etc. of CDNs 240. In this way, CDN 240 can process a data set that cannot be processed manually by a human actor.

In some implementations, user device 210 can dynamically determine a particular CDN 240 from which to start receiving content. For example, user device 210 might have received information from multiple CDNs 240 and can select a particular CDN 240 from which to start receiving the content based on the information. Additionally, or alternatively, user device 210 can dynamically determine a particular CDN 240 from which to receive content after user device 210 has begun to receive content from another CDN 240. For example, while user device 210 is receiving content from a first CDN 240, user device 210 can receive additional information from the first CDN 240 and a second CDN 240 and can determine whether to continue receiving the content from the first CDN 240 or to change to receiving the content from the second CDN 240. In some implementations, and continuing with the previous example, the first CDN 240 and the second CDN 240 can be a same CDN 240 or different CDNs 240. For example, user device 210 can determine to continue to receive content from the same CDN 240 or to receive content from a different CDN 240.

In some implementations, user device 210 can determine a particular CDN 240 from which to receive the content based on the information. For example, user device 210 can determine the particular CDN 240 based on a value identified by the information satisfying a threshold. Additionally, or alternatively, and as another example, user device 210 can determine the particular CDN 240 based on a preference (e.g., a user preference or a performance specification related to a quality of the content, interruptions during playback of the content, etc.). Continuing with the previous example, a user of user device 210 can prefer uninterrupted playback rather than preferring to receive content at a threshold quality. In this case, user device 210 can determine to receive content from a particular CDN 240 based on which CDN 240 has the fastest response time (e.g., relative to other CDNs 240).

Additionally, or alternatively, and as another example, user device 210 can determine the particular CDN 240 based on values for the information relative to other CDNs 240. Continuing with the previous example, user device 210 can compare information for multiple CDNs 240 and can select a particular CDN 240 that has the highest values for particular metrics related to other CDNs 240, the highest average rank for information relative to other CDNs 240, and/or the like.

In some implementations, user device 210 can determine a score for each CDN 240 and can determine a particular CDN 240 based on a value of the score. For example, user device 210 can determine a score based on the information satisfying a threshold, can determine a weighted score based on weighting particular information higher or lower relative to other information, can determine an average score based on an average value of information over time or based on an average score for particular information associated with CDN 240, can determine a score based on a trend of values for the information for CDN 240, and/or the like. In some implementations, user device 210 can select a particular CDN 240 associated with a higher score relative to other CDNs 240, associated with a threshold score, associated with an average score over a threshold amount of time or during a particular time period, and/or the like. In some implementations, user device 210 can re-determine a score for CDN 240 after receiving additional information related to an availability of content from CDN 240 and/or a capability of CDN 240 to provide the content.

In some implementations, user device 210 can receive the content after dynamically determining a particular CDN 240 from which to receive the content. For example, user device 210 can start receiving chunks of the content from CDN 240 (e.g., by requesting the chunks from CDN 240). Additionally, or alternatively, and as another example, user device 210 can stop receiving chunks of the content from a first CDN 240 and can start receiving chunks of the content from a second CDN 240. For example, while user device 210 is receiving chunks of content from a first CDN 240, user device 210 can receive additional information related to the content and/or CDN 240 and can dynamically determine to stop receiving chunks from the first CDN 240 and to start receiving chunks from a second CDN 240.

In some implementations, user device 210 can determine whether to increase or decrease a rate at which to receive the content from CDN 240. For example, user device 210 can determine that an amount of time for user device 210 to receive a chunk of the content (e.g., a download time) is more than an amount of time to provide the chunk of content for display (e.g., a serving time). In this case, user device 210 can determine to reduce a size of the chunks that user device 210 is receiving (and can provide a set of instructions to server device 220 to provide the chunks at the reduced size). In this way, user device 210 can scale down reception of chunks of content based on changes to network conditions (e.g., changes to available bandwidth, a reduced bit rate of CDN 240, etc.), thereby improving reception of chunks of content.

Additionally, or alternatively, and as another example, user device 210 can determine that an amount of time for user device 210 to receive a chunk of the content (e.g., a download time) is less than an amount of time to provide the chunk of content for display (e.g., a serving time). In this case, user device 210 can determine to increase a size of the chunks that user device 210 is receiving (and can provide a set of instructions to server device 220 to provide the chunks at the increased size). In this way, user device 210 can scale up reception of chunks of content based on changes to network conditions (e.g., changes to available bandwidth, an increased bit rate of CDN 240, etc.), thereby improving reception of the chunks of content.

In this way, user device 210 can dynamically determine a particular CDN 240 from which to receive the content prior to providing the content for display.

As further shown in FIG. 4, process 400 can include providing the content for display and/or performing another action related to the content after receiving the content from the CDN (block 430). For example, user device 210 can provide the content for display and/or can perform another action related to the content after receiving the content from CDN 240.

In some implementations, user device 210 can provide the content for display. For example, user device 210 can provide chunks of the content for display after receiving the chunks of content (e.g., via a display of user device 210). In some implementations, user device 210 can perform another action. For example, user device 210 can generate a report related to the content, CDNs 240 from which content was received, a performance of CDNs 240, a quality of the content received, and/or the like. Additionally, or alternatively, and as another example, user device 210 can provide a generated report for display to, for example, a network administrator or a network engineer. Additionally, or alternatively, and as another example, user device 210 can provide information for display indicating a particular CDN 240 from which content was received, whether content satisfies preferences of a user of user device 210, and/or the like.

Additionally, or alternatively, and as another example, user device 210 can store information related to receiving the content from CDN 240 (e.g., information that identifies a bit rate at which the content was provided, whether user device 210 changed CDNs 240 from which the content was received, etc.), such as to improve future analyses related to determining a particular CDN 240 from which to receive content. Continuing with the previous example, user device 210 can use stored information to identify a trend with respect to CDN 240's capability to provide content, a pattern related to information associated with CDN 240 and an actual performance of CDN 240, and/or the like, which can permit user device 210 to determine a prediction related to whether CDN 240 has a threshold capability to provide content. Additionally, or alternatively, user device 210 can record metrics related to the content (e.g., related to a capability of CDN 240 to provide the content, while user device 210 is receiving the content, etc.).

In this way, user device 210 can provide the content for display and/or perform another action related to the content after receiving the content from CDN 240.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
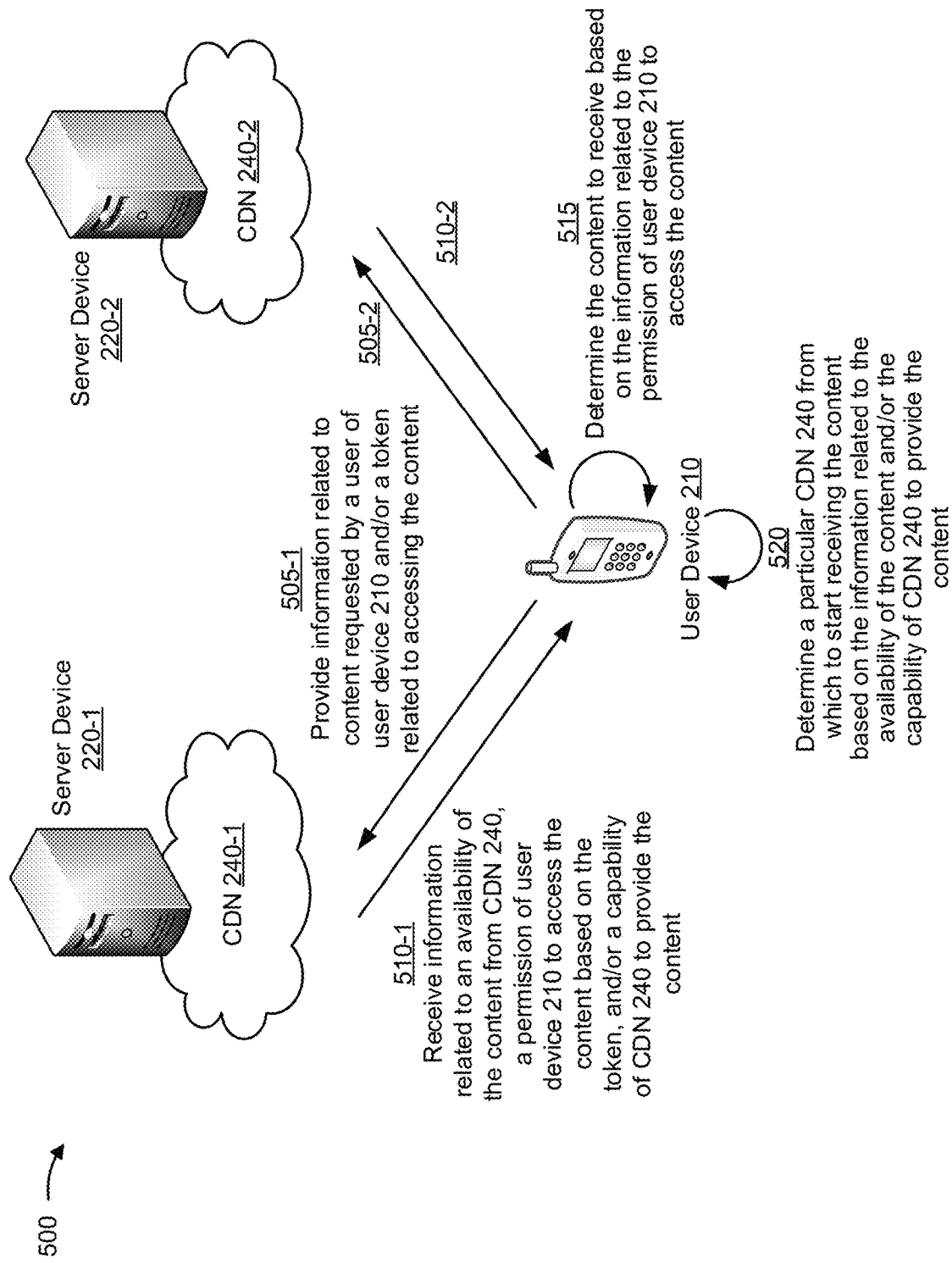
FIG. 5 is a diagram of an example implementation relating to the example process shown in FIG. 4.

FIG. 5 is a diagram of an example implementation 500 relating to example process 400 shown in FIG. 4. FIG. 5 shows an example of determining a particular CDN 240 from which to receive content. As shown, example implementation 500 incudes user device 210, server devices 220-1 and 220-2, and corresponding CDNs 240-1 and 240-2. Although FIG. 5 shows two CDNs 240 and two server devices 220, in practice, there can be hundreds, thousands, etc. of server devices 220 and/or CDNs 240.

As shown in FIG. 5, and by reference numbers 505-1 and 505-2, user device 210 can provide information related to content requested by a user of user device 210 and/or a token related to accessing the content to CDNs 240-1 and 240-2 (e.g., to server devices 220-1 and 220-2). For example, user device 210 can provide a universal resource identifier (URI), such as a universal resource name (URN) or a universal resource locator (URL), related to content requested by a user of user device 210 to server devices 220-1 and 220-2. Additionally, or alternatively, and as another example, user device 210 can provide information that identifies a DRM license associated with user device 210 and/or an account associated with user device 210 (e.g., can provide a token).

As shown by reference numbers 510-1 and 510-2, server devices 220-1 and 220-2 can receive information related to an availability of the content from CDN 240 (e.g., CDNs 240-1 and 240-2), a permission of user device 210 to access the content based on the token, and/or a capability of CDN 240 (e.g., CDNs 240-1 and 240-2) to provide the content. For example, server devices 220-1 and 220-2 can provide information indicating whether server devices 220-1 and 220-2 store the content and/or which chunks related to the content server devices 220-1 and 220-2 are storing. Additionally, or alternatively, server devices 220-1 and 220-2 can provide information indicating whether user device 210 has permission to receive the content (e.g., has permission to access the content at the resolution and/or format stored by server devices 220-1 and 220-2). Additionally, or alternatively, and as another example, server devices 220-1 and 220-2 can provide information identifying a bit rate at which server devices 220-1 and 220-2 can provide content, a response time of server devices 220-1 and 220-2, and/or the like.

As shown by reference number 515, user device 210 can determine the content to receive based on the information related to the permission of user device 210 to access the content. For example, user device 210 can determine to receive content in a high definition format, in a standard definition formation, at a particular resolution, with or without embedded advertisements, and/or the like based on a DRM license associated with user device 210, information from CDNs 240-1 and 240-2 that indicates whether user device 210 can access content stored by CDNs 240-1 and 240-2, and/or the like. In some implementations, the content that user device 210 determines to receive can affect which CDN 240 user device 210 selects to receive the content (e.g., the content that user device 210 determines to receive might not be available from all CDNs 240).

As shown by reference number 520, user device 210 can determine a particular CDN 240 from which to start receiving the content based on the information related to the availability of the content and/or the capability of CDN 240 to provide the content. For example, user device 210 can determine to start receiving the content from a particular CDN 240 based on the content being available from the particular CDN 240. Additionally, or alternatively, and as another example, user device 210 can determine to start receiving the content from a particular CDN 240 based on the particular CDN 240 being capable of providing the content at a threshold bit rate, the particular CDN 240 having a threshold amount of bandwidth available to provide the content, and/or the like (e.g., based on a score for the information).

In this way, user device 210 can determine content to receive and/or a particular CDN 240 from which to receive the content.

As indicated above, FIG. 5 is provided merely as an example. Other examples are possible and can differ from what was described with regard to FIG. 5.

Figure 6:
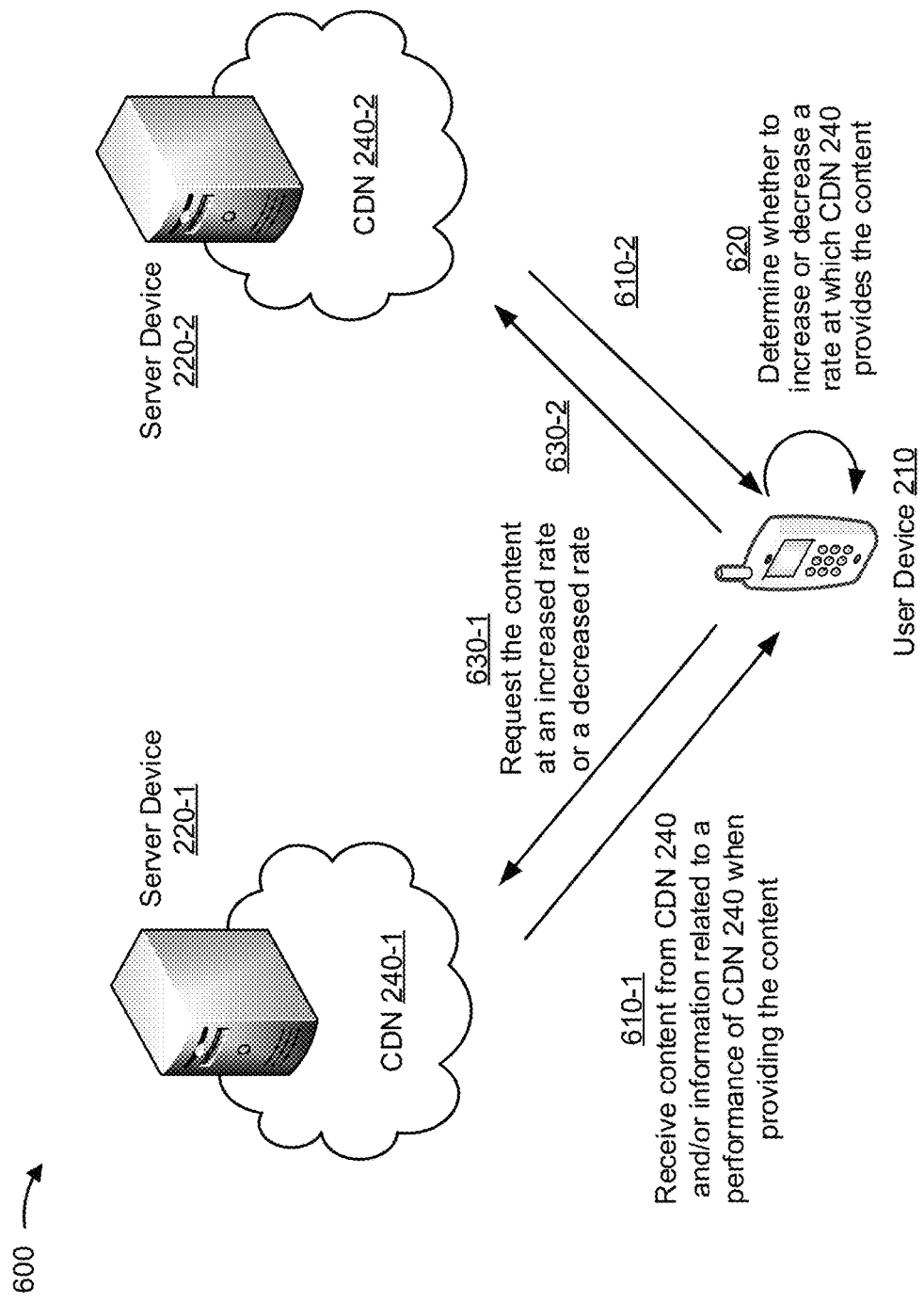
FIG. 6 is a diagram of an example implementation relating to the example process shown in FIG. 4.

FIG. 6 is a diagram of an example implementation 600 relating to example process 400 shown in FIG. 4. FIG. 6 show an example of increasing or decreasing a rate at which user device 210 receives content from CDN 240.

As shown in FIG. 6, and by reference numbers 610-1 and 610-2, user device 210 can receive content from CDN 240 (e.g., CDN 240-1 and/or CDN 240-2) and/or information related a performance of CDN 240 when providing the content. For example, user device 210 can receive requested content from a particular CDN 240. Additionally, or alternatively, and as another example, user device 210 can receive information that identifies a rate at which CDN 240 is providing the content (e.g., a bit rate, a download rate, etc.). Additionally, or alternatively, user device 210 can determine a rate at which user device 210 is capable of providing the content for display (e.g., a serving rate).

As shown by reference number 620, user device 210 can determine whether to increase or decrease a rate at which CDN 240 provides the content. For example, if a rate at which CDN 240 is providing content satisfies a threshold, is greater than a rate at which user device 210 provides the content for display, and/or the like, then user device 210 can determine to decrease (e.g., scale down) the rate at which CDN 240 provides the content. Continuing with the previous example, user device 210 can provide a set of instructions to CDN 240 to cause CDN 240 to decrease a rate at which CDN 240 provides the content. Conversely, and as another example, if user device 210 determines that a rate at which CDN 240 is providing the content satisfies a threshold, is less than the rate at which user device 210 provides the content for display, and/or the like, then user device 210 can determine to increase (e.g., scale up) the rate at which CDN 240 provides the content. For example, user device 210 can provide a set of instructions to CDN 240 to cause CDN 240 to increase a rate at which CDN 240 provides the content.

As shown by reference numbers 630-1 and 630-2, user device 210 can request the content at an increased rate or a decreased rate. For example, user device 210 can provide a set of instructions to CDN 240 to provide the content at an increased rate. Conversely, and as another example, user device 210 can provide a set of instructions to CDN 240 to provide the content at a decreased rate.

In this way, user device 210 can increase or decrease a rate at which CDN 240 provides content.

As indicated above, FIG. 6 is provided merely as an example. Other examples are possible and can differ from what was described with regard to FIG. 6.

In this way, user device 210 can use information to dynamically identify content to request and/or download and/or a particular CDN 240 from which to request the content (e.g., without downloading chunks of the content). This conserves network resources that would otherwise be consumed requesting and/or downloading chunks of the content. In addition, this conserves processing resources of user device 210 that would otherwise be consumed when user device 210 processes content that user device 210 cannot use or that CDN 240 cannot provide at a threshold level of performance (e.g., at a threshold bit rate). Further, this conserves processing resources of CDN 240 by reducing or eliminating a need for CDN 240 to provide chunks of content that user device 210 cannot use. Further, this conserves network resources and/or processing resources of multiple CDNs 240 that would be consumed providing the same chunk of content to user device 210, such as to permit user device 210 to analyze a capability of the multiple CDNs 240 to provide the content.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive information related to an availability of content from multiple content delivery networks or a capability of the multiple content delivery networks to provide the content,
the information being received without requesting or receiving the content, and
the content including a first portion and a second portion that are different;

determine to receive the first portion of the content from a first content delivery network, of the multiple content delivery networks, based on the information;

receive the first portion of the content from the first content delivery network after determining to receive the first portion of the content from the first content delivery network;

determine, after receiving the first portion of the content and based on stored information, a trend with respect to a capability of the first content delivery network to provide the content;

determine, based on the trend, a prediction related to whether the first content delivery network has a threshold capability to provide the content;

receive additional information related to the availability of the content from the multiple content delivery networks or the capability of the multiple content delivery networks to provide the content,
 a portion of the information or a portion of the additional information being received based on a request associated with a protocol;

determine to receive the second portion of the content from a second content delivery network, of the multiple content delivery networks, based on the additional information and the prediction;

receive the second portion of the content from the second content delivery network after determining to receive the second portion of the content from the second content delivery network;

determine that an amount of time for the device to receive a chunk of the content is less than an amount of time to provide the chunk of the content for display;

determine to increase a size of chunks that the device is receiving based on determining a change to an amount of available bandwidth between the multiple content delivery networks and the device;

request for the second content delivery network to provide the chunks at the increased size; and perform an action after receiving the second portion of the content.

2. The device of claim 1, where the one or more processors are further to:
provide, to the multiple content delivery networks, the request; and
where the one or more processors, when receiving the information or receiving the additional information, are to:
receive the portion of the information or receive the portion of the additional information after providing the request to the multiple content delivery networks.

3. The device of claim 1, where the one or more processors are further to:
determine a score for the multiple content delivery networks based on the information,
the score relating to the availability of the content or the capability of the multiple content delivery networks to provide the content; and
where the one or more processors, when determining to receive the first portion of the content, are to:
determine to receive the first portion of the content from the first content delivery network based on the score for the multiple content delivery networks.

4. The device of claim 3, where the one or more processors are further to:
determine another score for the multiple content delivery networks based on the additional information; and
where the one or more processors, when determining to receive the second portion of the content, are to:
determine to receive the second portion of the content from the second content delivery network after determining another score.

5. The device of claim 1, where the first content delivery network and the second content delivery network are different content delivery networks.

6. The device of claim 1, where the one or more processors, when performing the action, are to:
generate a report related to the first portion of the content or the second portion of the content.

7. The device of claim 1, where on the one or more processor, when receiving the information, are to:
receive the information using an HTTP head request to obtain metadata associated with the content without requesting the content.

8. A non-transitory computer-readable medium storing instructions, the instructions comprising:
one or more instructions that, when executed by one or more processors of a device, cause the one or more processors to:
receive information related to an availability of content from multiple content delivery networks or a capability of the multiple content delivery networks to provide the content,
the information being received without requesting or receiving the content, and
the content including a first portion and a second portion that are different;
determine to receive the first portion of the content from a first content delivery network, of the multiple content delivery networks, based on the information;
receive the first portion of the content from the first content delivery network after determining to receive the first portion of the content from the first content delivery network;
determine a trend with respect to a capability of the first content delivery network to provide the content;
determine, based on the trend, a prediction related to whether the first content delivery network has a threshold capability to provide the content;
receive additional information related to the availability of the content from the multiple content delivery networks or the capability of the multiple content delivery networks to provide the content,
a portion of the information or a portion of the additional information being received based on a request associated with a protocol;
determine to receive the second portion of the content from a second content delivery network, of the multiple content delivery networks, based on the additional information and the prediction;
receive the second portion of the content from the second content delivery network after determining to receive the second portion of the content from the second content delivery network;
determine that an amount of time for the device to receive a chunk of the content is less than an amount of time to provide the chunk of the content for display;
determine to increase a size of chunks that the device is receiving based on a change to an amount of available bandwidth between the multiple content delivery networks and the device;
request for the second content delivery network to provide the chunks at the increased size; and perform an action after receiving the second portion of the content.

9. The non-transitory computer-readable medium of claim 8, where the one or more instructions, that cause the one or more processors to receive the information or to receive the additional information, cause the one or more processors to:
receive the information or to receive the additional information based on monitoring for the information or the additional information.

10. The non-transitory computer-readable medium of claim 8, where the one or more instructions, that cause the one or more processors to determine to receive the first portion of the content or to receive the second portion of the content, cause the one or more processors to:
determine to receive the first portion of the content from the first content delivery network or to determine to receive the second portion of the content from the second content delivery network based on a score associated with the multiple content delivery networks.

11. The non-transitory computer-readable medium of claim 8, where the first portion of the content and the second portion of the content are received from different content delivery networks.

12. The non-transitory computer-readable medium of claim 8, where the first content delivery network and the second content delivery network are a same content delivery network.

13. The non-transitory computer-readable medium of claim 8, where the one or more instructions, that cause the one or more processors to perform the action, further cause the one or more processors to:
record a set of metrics related to the content while receiving the content from the multiple content delivery networks.

14. The non-transitory computer-readable medium of claim 8, where the one or more instructions, that cause the one or more processors to receive the information, further cause the one or more processors to:
receive the information using an HTTP head request to obtain metadata associated with the content without requesting the content.

15. A method, comprising:
receiving, by a device, information related to an availability of content from multiple content delivery networks or a capability of the multiple content delivery networks to provide the content,
the information being received without requesting or receiving the content, and
the content including a first portion and a second portion that are different;
determining, by the device, to receive the first portion of the content from a first content delivery network, of the multiple content delivery networks, based on the information;
receiving, by the device, the first portion of the content from the first content delivery network after determining to receive the first portion of the content from the first content delivery network;
determining, by the device, a trend with respect to a capability of the first content delivery network to provide the content;
determining, by the device and based on the trend, a prediction related to whether the first content delivery network has a threshold capability to provide the content;
receiving, by the device, additional information related to the availability of the content from the multiple content delivery networks or the capability of the multiple content delivery networks to provide the content,
a portion of the information or a portion of the additional information being received based on a request associated with a protocol;
determining, by the device, to receive the second portion of the content from a second content delivery network, of the multiple content delivery networks, based on the additional information and the prediction;
receiving, by the device, the second portion of the content from the second content delivery network after determining to receive the second portion of the content from the second content delivery network;
determining, by the device, that an amount of time for the device to receive a chunk of the content is less than an amount of time to provide the chunk of the content for display;
determining, by the device, to increase a size of chunks that the device is receiving based on determining a change to an amount of available bandwidth between the multiple content delivery networks and the device;
requesting, by the device, for the second content delivery network to provide the chunks at the increased size; and
performing, by the device, an action after receiving the second portion of the content.

16. The method of claim 15, where determining to receive the second portion of the content comprises:
determining to receive the second portion of the content from the second content delivery network based on a first score associated with the first content delivery network and a second score associated with the second content delivery network.

17. The method of claim 15, where the first portion of the content and the second portion of the content are received from a same content delivery network.

18. The method of claim 15, further comprising:
determining to decrease a first rate at which the device is receiving the content; and
where receiving the first portion of the content or receiving the second portion of the content comprises:
receiving the first portion of the content or receiving the second portion of the content after determining to decrease the first rate.

19. The method of claim 15, further comprising:
determining a prediction related to the capability of the multiple content delivery networks to provide the content based on other information associated with other content delivery networks; and
where determining to receive the first portion of the content from the first content delivery network or determining to receive the second portion of the content from the second content delivery network comprises:
determining to receive the first portion of the content from the first content delivery network or determining to receive the second portion of the content from the second content delivery network based on the prediction.

20. The method of claim 15, where receiving the information comprises:
receiving the information using an HTTP head request to obtain metadata associated with the content without requesting the content.

* * * * *